(No Model.)  F. F. RAYMOND, 2d.  5 Sheets—Sheet 3.
NAIL MAKING MACHINE.

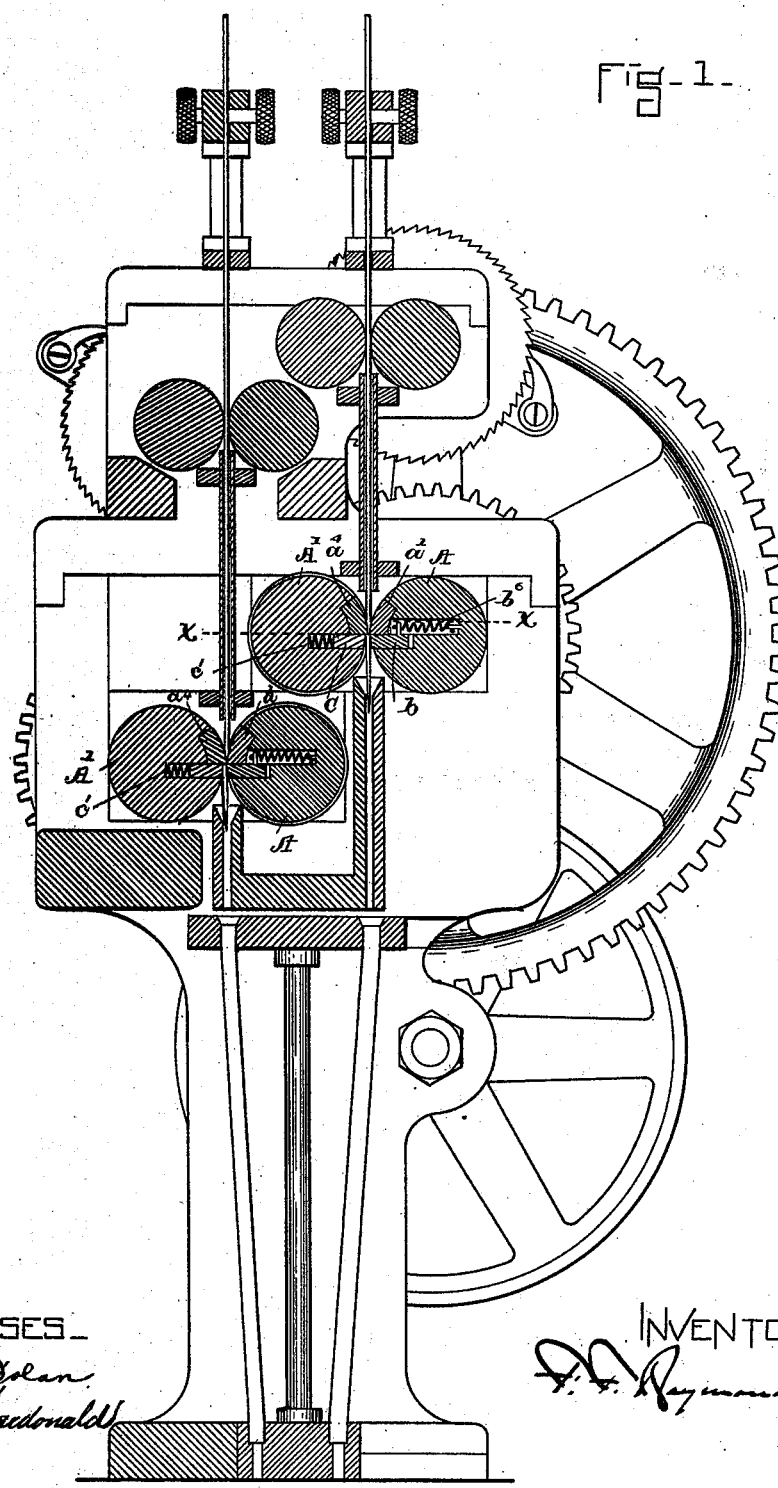

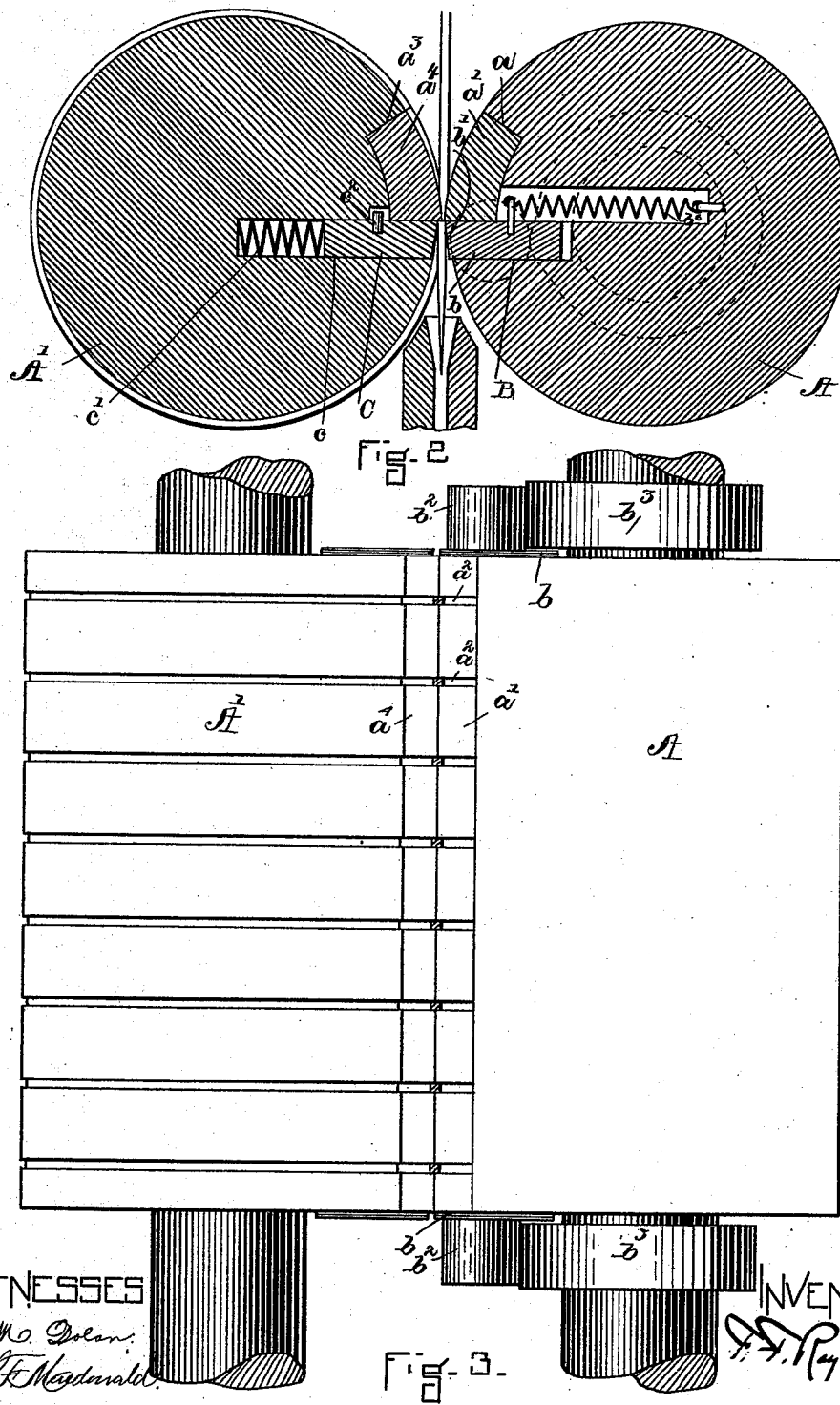

No. 413,964.  Patented Oct. 29, 1889.

(No Model.) 5 Sheets—Sheet 4.
F. F. RAYMOND, 2d.
NAIL MAKING MACHINE.
No. 413,964. Patented Oct. 29, 1889.
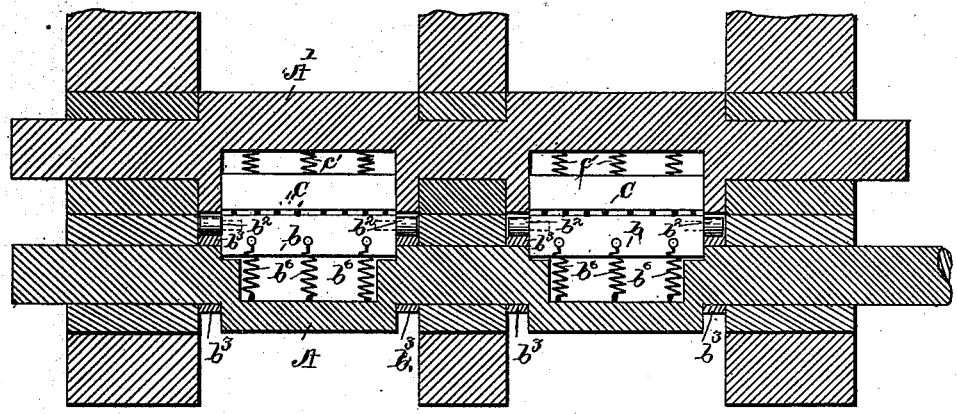
Fig-7-
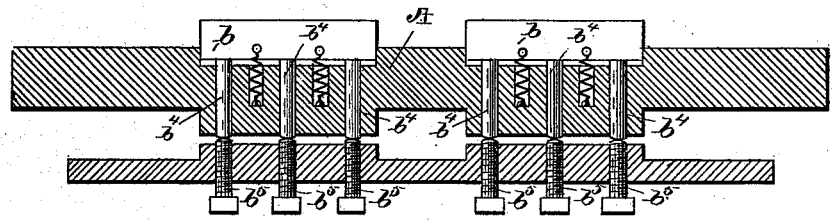
Fig-8-
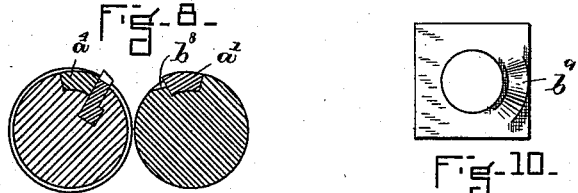
Fig-9-       Fig-10-
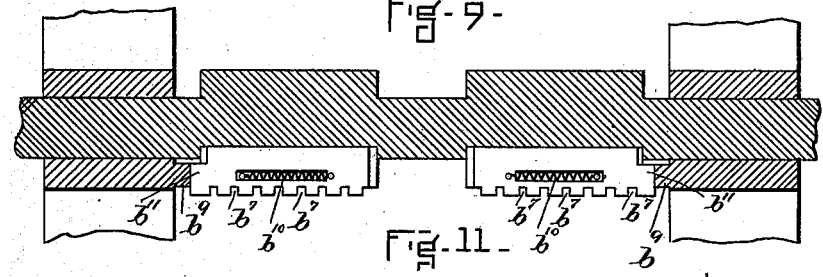
Fig-11-
WITNESSES.                                    INVENTOR.
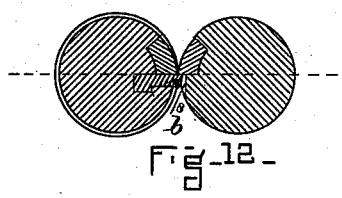
Fig-12-

(No Model.) 5 Sheets—Sheet 5.

F. F. RAYMOND, 2d.
NAIL MAKING MACHINE.

No. 413,964. Patented Oct. 29, 1889.

WITNESSES
J. M. Dolan
A. F. Macdonald

INVENTOR
F. F. Raymond 2d

UNITED STATES PATENT OFFICE.

FREEBORN F. RAYMOND, 2D, OF NEWTON, MASSACHUSETTS.

NAIL-MAKING MACHINE.

SPECIFICATION forming part of Letters Patent No. 413,964, dated October 29, 1889.

Application filed February 11, 1889. Serial No. 299,516. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail-Making Machines, of which the following is a full, clear, and exact description, reference being had to the accompanying drawings, forming a part of this specification, in explaining its nature.

The invention is an improvement upon that described in my patent, No. 381,280, dated April 17, 1888. In said patent each nail-making device comprises rotary dies and a separate cut-off.

The present invention relates to the combination, with a number of independent dies, of a common cut-off bar adapted to take the place of a number of the independent cut-offs described in the specification of said patent, and providing for the cheapening of the construction of the machine, and at the same time increasing its efficiency.

The invention further relates to the various details of construction and organization involving these parts, all of which is hereinafter specified.

Figure 4:
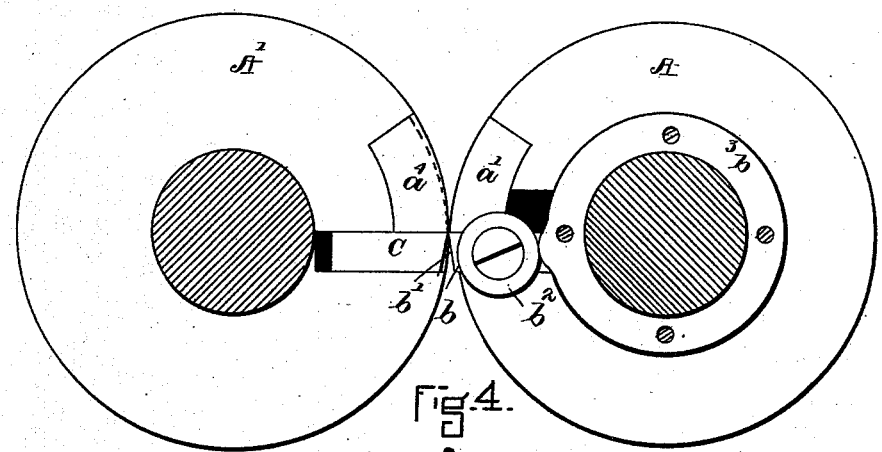
Figure 5:
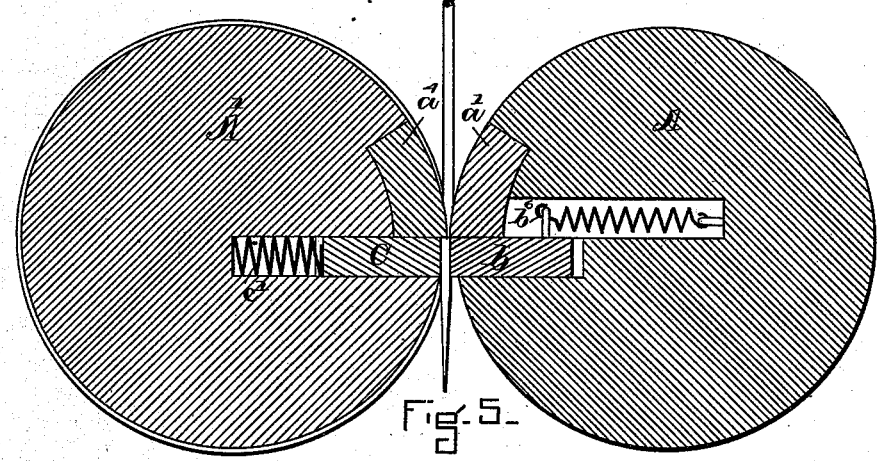
Figure 6:
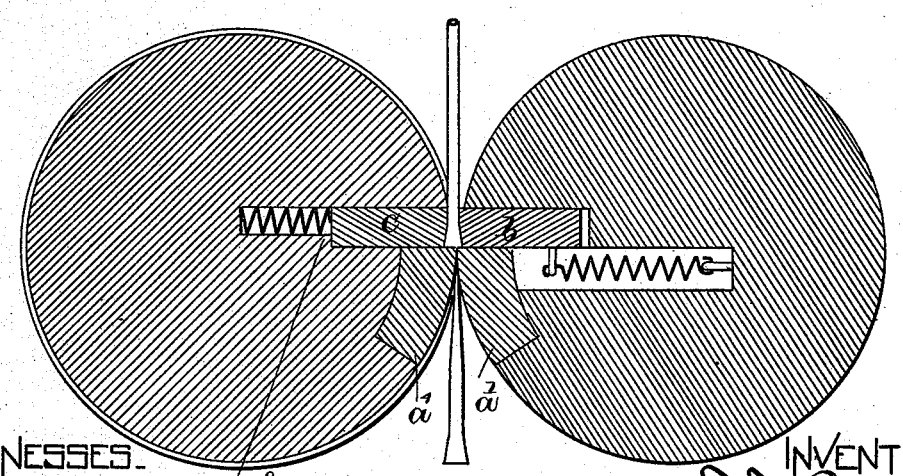
Figure 13:
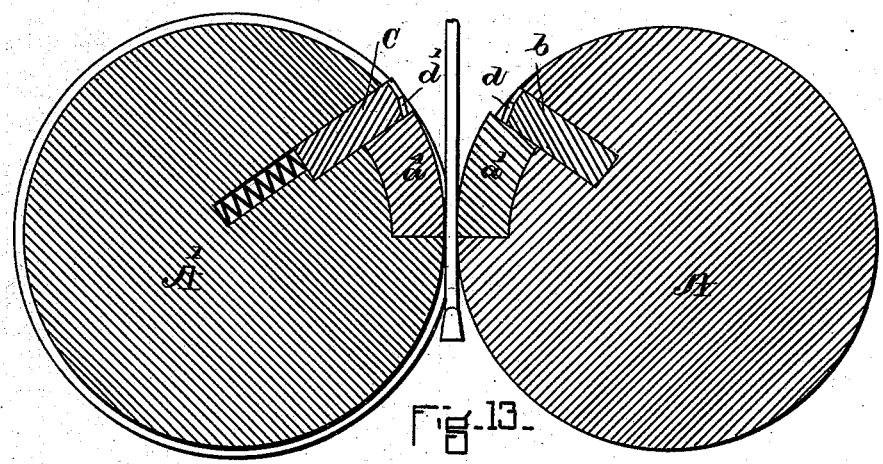
Figure 14:
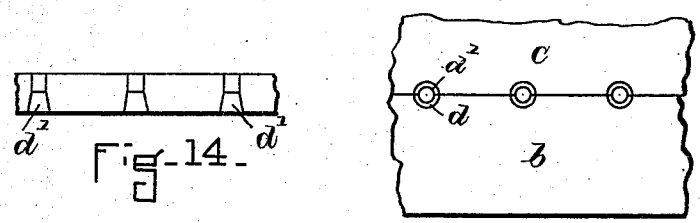
Figure 15:
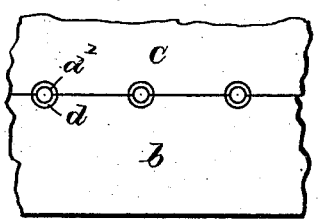
Figure 16:
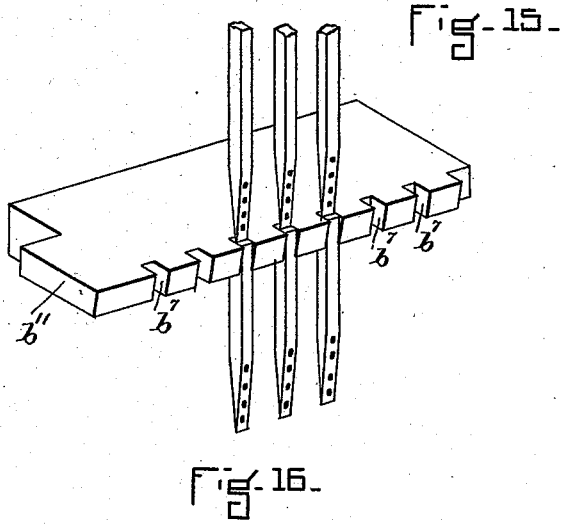

In the drawings, Figure 1 illustrates a vertical central section of a machine having the features of my invention. Fig. 2 is a detail view in vertical central section of two of the die-rolls, enlarged. Fig. 3 is a detail view in plan of the rolls, enlarged. Fig. 4 is a view in end elevation of the rolls, enlarged. Fig. 5 is a view in vertical section through said rolls, representing a slight modification in the form of the cut-off. Fig. 6 illustrates in vertical section a modification in the relation of the cut-off to the dies and in the shape of the cut-off, whereby they act additionally to form headed nails. Fig. 7 is a horizontal section upon the line $x\ x$ of Fig. 1. Fig. 8 is a detail view in horizontal section, to which reference is hereinafter made. Figs. 9, 10, 11, 12, 13, 14, 15, and 16 refer to a slight change in the shape of the cut-off and presser bars and their arrangement to the dies, to which reference is hereinafter made.

In the drawings, A represents one die roll or shaft, and A' the other. In the roll or shaft A is a longitudinal recess $a$, in which is secured a die-plate $a'$, having a number of die projections $a^2$. The roll A' has the longitudinal recess $a^3$, in which is set the die-plate $a^4$, having the die-recesses $a^5$, the said projections $a^2$ and the recesses $a^5$ forming a series of pointing box-dies. There is also formed in the roll A a deep longitudinal recess B, in which is mounted to slide radially or transversely the length of the roll the cut-off plate $b$. This plate extends the entire length of the die-plates $a'\ a^4$, and has the cutting or severing edge $b'$, and is actuated either by means of cam rolls or pins $b^2$, attached to each end of the plate, (see Figs. 4 and 7,) and the stationary cams $b^3$, (see Figs. 4 and 7,) or by means of the extensions $b^4$, (see Fig. 8,) which extend backward from the inner edge of the cut-off plate through holes in the rolls to be operated by the stationary cams $b^5$, formed upon the ends of screw-studs. This construction is similar to that described in my said patent, with the exception that the extensions $b^4$ do not correspond to the number of dies used, and are not themselves the cut-offs, but simply the connections between the cut-off bar and the operating-cams, whereby motion is communicated to the bar. The cut-off bar may have its outer edge $b'$ inclined, as represented in Fig. 4, or straight, as represented in Fig. 5. I prefer the latter form of surface, as it then operates not only to sever the nail, but also in connection with the presser-bar C to support it. The presser-bar C is, like the cutter-bar, made in one piece and set into the deep recess $c$ in the roll A'. It extends the length of the die-block $a^4$, and is pushed outwardly by the springs $c'$, the extent of its outward movement being limited by a stop $c^2$. To withdraw or move inward the cut-off bar or plate, I have represented the springs $b^6$ contained in holes in the roll and connecting the roll with the plate. In Fig. 7 I have shown the cut-off bar as drawn inward by three springs thus held.

The outer surface of the presser-bar C may be inclined, as represented in Figs. 2 and 4, or may be plane, as represented in Fig. 5.

In Figs. 9 to 12, inclusive, I have represented the cut-off bar as provided with a severing movement lengthwise the rolls instead of crosswise the rolls, and the bar when provided with such movement also has the notches or recesses $b^7$, which, when the bar is in its normal position, are in line with the cavities of the dies. The outer edge of the bar projects beyond the dies of the roll upon which it is used, and there is a cavity or recess $b^8$ formed in the other roll to receive such projecting section when the two rolls come together. (See Figs. 9 and 12.) The notches or recesses $b^7$ also receive the wires as the rolls rotate, and when the points of the dies have come together, as represented in Fig. 12, the cut-off bar is moved lengthwise the roll by means of a stationary cam $b^9$, (see Figs. 10 and 11,) which furnishes bearings for the rolls. This imparts to the cut-off bar a slight longitudinal movement and causes the nails to be severed or cut from the pointed ends of the wires which are held by the dies, (see Fig. 12,) a surface of the bar upon each side of a notch or recess $b^7$ acting as the cutter instead of the front edge when the cut-off bar is moved outwardly from the center of the roll. A spring $b^{10}$, attached to the roll and to the cut-off bar and contained in a slot formed either in the roll or in the cut-off bar, serves to hold the end $b^{11}$ of the cut-off bar in contact with the cam $b^9$.

In Figs. 6, 13, 14, and 15 I have represented a slightly-different arrangement of the dies and cut-off and presser bars, the dies being represented as arranged upon their rolls or shafts in advance of the bars as they rotate, or, in other words, so as to form the nail with the point uppermost. This enables the pressure and cut-off bars to be also used for forming heads of conical or other shape upon wire at the instant that the previously headed and pointed nail is severed.

The cut-off bar is like that described in my said patent or as above specified—that is, there may be a separate bar for each set of dies—or all the cut-offs made from one piece or bar, as above specified, and the same is true of the presser-bar. The cut-off bar, instead, however, of having a flat, plane, or beveled edge, has a cavity $d$ formed in it of the shape which it is desired to give one-half the head of the nail, and the presser-bar has a cavity $d'$ of similar shape, so that the two cavities $d\ d'$ form a mold, matrix, or die for fashioning or shaping the head. When the cut-off and presser blocks are thus formed, there is provided an abutment $d^2$, against which the presser-block is moved, so that after the severing or during the formation of the head it may be held rigidly or solidly; or it may even operate positively in the same manner that the cut-off bar is operated.

The action of the dies and head-forming and cut-off mechanism is as follows: The dies act to draw the point or shank and point of the nail and to crowd surplus metal into the head-forming recesses $d\ d'$ in the cut-off and presser bar, which are then closing or coming to the position represented in Fig. 6, and this is immediately followed by the severing movement, which closes the cut-off bar onto the presser-bar, and thereby gives form to the head of the nail, while at the same instant it severs the previously-pointed nail, (see Fig. 6,) the head being formed either by the surplus metal forced by the drawing-dies into the cavity $d\ d'$ and the immediate closing of one or both of these bars, or by the closing action of the bars or one of them in relation to the other alone. This produces the headed drawn pointed nail, the nail being delivered head first instead of point first.

I have heretofore described in a multiple nail-making machine a construction which involves the use of separate dies and a separate cut-off for each pair of dies, and also involves the employment of separate means for actuating each cut-off, each of which must have independent adjustment. While this construction operates well, it is expensive and necessitates certain forms of organization which are to some extent objectionable. To cheapen the construction, as well as to strengthen it, and to do away with the objectionable features, I have employed, instead of a separate cut-off independently operated for each die, the long cut-off bar above described. This bar, being in one piece, is stronger and more cheaply applied than the separate cut-offs above referred to. It is also operated from one point or a few points instead of from as many points as there are dies, and it also enables one adjustment to affect all the dies, so that if the bar is adjusted to properly sever one nail it has the adjustment for properly working with all the dies. It is immaterial, so far as this feature of the invention is concerned, whether this bar be moved practically radially, as are the single cut-offs above referred to, or whether it is moved longitudinally the roll. I consider that these features are of minor consequence, the principal part of the invention being the consolidation of the various cut-offs into one bar and the movement of said bar, whereby the advantages above enumerated are obtained.

Having thus fully described my invention, I claim and desire to secure by Letters Patent of the United States—

1. In a nail-making machine, the combination of a series of nail-pointing dies, arranged upon the same line and adapted to be simultaneously operated, with a common cut-off bar $b$, substantially as described.

2. The combination of the dies $a'\ a^4$ and the blocks $b$ C, having head-forming cavities, and one or both of which are laterally movable across the ends of the dies, substantially as described.

3. The combination of the movable dies $a'\ a^4$ and the cut-off bar $b$, carried above or at the rear end of said dies and movable across the same, substantially as described.

4. The combination of wire-feed mechanism with the cut-off bar or block $b$, having one or more head-forming recesses $d$, substantially as described.

5. The combination of the movable block or bar $b$, having one or more head-forming recesses $d$, with the movable presser bar or block C, adapted to co-operate with the block $b$, as described.

6. The combination of the movable block or bar $b$, having one or more head-forming recesses $d$, with the movable presser bar or block having one or more head-forming recesses $d'$, substantially as described.

7. The combination of the drawing or heading dies $a'$ $a^4$ with the head-forming and cut-off device comprising the bars $b$ C, having one or more head-forming recesses, and one or both of which are movable laterally across the line of action of the drawing-dies, substantially as described.

FREEBORN F. RAYMOND, 2D.

In presence of—
J. M. DOLAN,
A. F. MACDONALD.